United States Patent
Green

(10) Patent No.: US 6,908,570 B2
(45) Date of Patent: *Jun. 21, 2005

(54) COMPOSITIONS FOR IMPROVED RECOVERY OF METALS

(75) Inventor: Frederick H. Green, Paola, KS (US)

(73) Assignee: Discovery Resources, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/694,543

(22) Filed: Oct. 27, 2003

(65) Prior Publication Data

US 2004/0089841 A1 May 13, 2004

Related U.S. Application Data

(63) Continuation-in-part of application No. 09/354,691, filed on Jul. 15, 1999, now Pat. No. 6,669,864, which is a continuation-in-part of application No. 08/693,287, filed on Aug. 14, 1996, now abandoned.

(51) Int. Cl.$^7$ ................................................ C09K 3/00
(52) U.S. Cl. ................................................ 252/184
(58) Field of Search ........................................ 252/184

(56) References Cited

U.S. PATENT DOCUMENTS 6,395,082 B2 * 5/2002 Shimbori .................... 106/626

FOREIGN PATENT DOCUMENTS

JP 50008371 * 1/1975

* cited by examiner

Primary Examiner—Cephia D. Toomer
(74) Attorney, Agent, or Firm—Harrison Law Office

(57) ABSTRACT

Liquor compositions for the extraction of metallic elements from solid and liquid metal-contaminated starting material such as mineral ores, recyclable wastes, contaminated soils, engraving solutions, metal finishing solutions, battery manufacturing solutions, toxic wastes such as dusts producing through steelmaking processes by effectuating preferably prolonged contacting of such starting material with the liquor to cause the underlying structure of the starting material to be broken down. The contaminated starting materials are more susceptible to metal separation because the released metallic element are readily solubilized in the contacting liquor. Compositions of the contacting liquor comprise caustic silicate solutions containing essentially saturating levels of silica. Once the plurality of metallic elements contained in the starting material have been solubilized, they tend to remain in solution, and then may be routinely extracted and removed using conventional extraction methodologies such as precipitation of insoluble salts, electrowinning, or electrodeposition.

3 Claims, No Drawings

COMPOSITIONS FOR IMPROVED RECOVERY OF METALS

RELATED APPLICATIONS

This application is a continuation-in-part of U.S. application Ser. No. 09/354,691 filed Jul. 15, 1999, now U.S. Pat. No. 6,669,864, which is a continuation-in-part of U.S. application Ser. No. 08/693,287 filed Aug. 14, 1996, now abandoned.

TECHNICAL FIELD

The present invention relates to improved compositions used for the extraction and recovery of metals from starting materials such as mineral ores, recyclable wastes, contaminated soils, toxic wastes such as dusts producing through steelmaking processes (such as electric arc furnace dusts and BOP dusts), aqueous solutions containing contaminants and miscellaneous wastes, and other materials. More particularly, the present invention relates to embodiments of caustic silica solution compositions for enhancing and expediting the extraction and recovery of metals from mineral ores, recyclable wastes, contaminated soils, toxic wastes such as dusts producing through steelmaking processes (such as electric arc furnace dusts and BOP dusts), and other materials. The present invention also relates to embodiments of such caustic silica solution compositions for enhancing and expediting the extraction and recovery of metals from aqueous waste solutions typified by engraving liquid wastes contaminated by spent ferric chloride, aircraft manufacturing wastes contaminated by chromium, metal finishing liquid wastes contaminated by zinc, and battery manufacturing wastewater contaminated by nickel, lead, and zinc, and other materials.

BACKGROUND OF THE INVENTION

A wide variety of methods for chemical extraction and/or recovery are known in the art, particularly in regard to extraction and recovery of metals from materials such as mineral ores, recyclable wastes, and contaminated soils. Such methods include, for example, amalgamation that often produces health hazards and clean-up hazards; flotation that requires finely ground, de-slimed, clean, free metal; cyanide treatment that offers specific extraction, but presents environmental hazards; centrifugal concentration which works primarily for free on heavy metals; electrolytic/electrowinning processes that are expensive and slow; thermal/furnace processes that are energy intensive and expensive; and chlorination/bromination processes that require high pressure digesters that are, in turn, expensive, hazardous, and leak-prone.

Representative of the prior art, Rizet, in U.S. Pat. No. 5,549,811, teaches a process for decontamination of soils polluted with metals, wherein the polluted soil is treated with a NaOH solution to remove contaminant metals. By leaching this contaminated soil with a soda-solution containing a concentration of about 6N NaOH, the contaminants are precipitated in the form of hydroxides metals and then extracted via simple solid-liquid separation techniques. Thus, Rizet attempts to prepare contaminant metals for subsequent extraction stages well known in the art.

It will be apparent to those skilled in the art that the extraction solution taught by Rizet contains 2% hydrogen peroxide, an oxidizer, and 25–30% sodium hydroxide. His procedure includes the application of lime in a sufficient quantity to remove silica from the extract solution by effectuating precipitation of aluminosilicates that may have become solubilized. Also included is a second wash of the soil that contains the precipitated aluminosilicates with a 6N soda-solution and pH of 14, thereby tending to redissolve some of the silica that has been precipitated by the lime. By sustaining a basic medium with a pH of 14, Rizet avoids the precipitation of lead in the form of hydroxide. Besides the recovered lead, silica remains in the wash liquid.

Also indicative of the art is European Patent No. 34137 in which Reiterer discloses a process for the hydrometallurgical treatment of materials that contain zinc, wherein pulverized zinc-containing materials are initially subjected to basic leaching with alkali hydroxide. Precipitate is separate from the liquid, and the liquid is diluted with water and acidified to a pH below 7 in order to precipitate SiO. Prior to this SiO precipitation, $Cl^-$ and $NH^+$ ions are introduced into the solution. Then, once Cu and Cd have been separated, the Zn-containing solution is subjected to an ion exchange or solvent extraction process, and, if necessary, to an electrolytic purification process.

Since Rizet discloses that approximately 1–3 g/l silica is present in the post-leaching solution, the Examiner concludes that Applicant's caustic silica solution—inherent in Applicant's chemical processing step—and concomitant treatment methodology would have been obvious to those of ordinary skill in the art.

Japanese Patent No. 5000837, Laid-Open Publication No. Sho 50-8371, teaches that the removal of copper from waste liquids as a precipitate in the form of a neutral hydroxide compound. It will be appreciated by those skilled in the art that the slimy nature of this precipitate renders it difficult to settle, and, of course, such adverse settling characteristics are known to be improved by incorporating silica powder into the alkaline solution. The amount of caustic required prerequisite for precipitation of small quantities of copper, such as 400 ppm copper in stoichiometric amounts, e.g., approximately 220 ppm hydroxide ion or 500 ppm caustic is obviously still small. As clearly demonstrated in this Japanese Patent, excess caustic usage is not necessary.

Each of these approaches use an initial alkali-based leaching step to attempt to solubilize the metal contaminant portion and the like so that it may be extracted from the contaminated material. Unfortunately, as will be appreciated by those skilled in the art, only limited extraction of metals from ores, dust, and the like has been hereinbefore obtained using conventional separation methods. It would be advantageous for promoting extraction of metals from such contaminated materials if a leaching solution and concomitant methodology were developed that is capable of achieving levels of metal extraction heretofore unknown in the art.

The present invention overcomes many of the disadvantages of known extraction and recovery methods by providing liquor compositions that, while leaching the contaminated materials under mild conditions, effect a chemical change in the underlying structure of the contaminated materials wherein a permanent proclivity for metal extraction and recovery is attained. The present invention performs this extraction and recovery function while generating relatively innocuous by-products or wastes.

SUMMARY OF THE INVENTION

One aspect of the present invention pertains to the use of liquor compositions for the extraction of preferably a metallic element from a metal-contaminated starting material comprising solids—containing this element—by effectuating preferably prolonged contacting of such starting material with the liquid or liquor to cause the underlying structure of the starting material to be broken down to an extent heretofore unknown in the art. As will be hereinafter described, this breakdown of the underlying, typically complex structure, renders the contaminated starting materials to be more susceptible to metal separation than has been hereinbefore believed possible. Once the starting material has thus been properly chemically treated preferably with a caustic silica solution as will be hereinafter described in detail, a mixture of solids and liquid is formed, thereby effectively solubilizing the metallic element in the liquid, wherein a liquid extract may be readily separated from this mixture of solids and liquid.

It will become clear to those skilled in the art that the compositions of caustic silicate solution of the present invention correspond essentially to saturating levels of silica. It has been discovered that the presence of such a constituted caustic silicate solution afford a synergy of chemical and physical properties that apparently vigorously attack the formerly stubborn, hard-to-crack underlying structure of the silica-containing starting material.

In some preferred embodiments, this caustic silica solution comprises 0.001% to about 5% w/w dissolved silica. In some preferred embodiments, this caustic silica solution comprises silica; and one or more of sodium hydroxide, potassium hydroxide, and ammonium hydroxide. In some preferred embodiments, the caustic silica solution comprises silica; and one or more of sodium hydroxide, potassium hydroxide, and ammonium hydroxide. In some preferred embodiments, the caustic silica solution comprises silica; and an alkali metal hydroxide. In some preferred embodiments, this caustic silica solution comprises silica; and one or more of sodium hydroxide and potassium hydroxide. In some preferred embodiments, this caustic silica solution comprises silica; and sodium hydroxide. In some preferred embodiments, the caustic silica solution comprises silica and 1–60% w/w sodium hydroxide.

In some preferred embodiments, the leaching or contacting is performed at a temperature of 10–200° C. for a period of 10 minutes to 6 hours. In some preferred embodiments, this leaching or contacting is performed at a temperature of 10–200° C. for a period of 10 minutes to 6 hours under a pressure of 0.1 to 5 MPa. In some preferred embodiments, this starting material comprises a mineral ore, soil, toxic waste, or dust produced through steelmaking processes. As will be appreciated by those skilled in the art, some preferred embodiments are designed to perform the extraction of the present invention upon starting material that comprises dust produced by an electric arc furnace. Some preferred embodiments are designed to perform the extraction of the present invention upon starting material that includes metal as a contaminant. Some other embodiments are formulated to perform the extraction of the present invention upon starting material that includes an element selected from the group consisting of heavy metals, noble metals, platinum group metals, and toxic metals. Similarly, other embodiments are formulated to perform the extraction of the present invention upon starting material that includes an element selected from the group consisting of Pb, Au, Cd, Zn, As, Ba, Cr, Hg, Se, Ag, Pt, Ti, V, Mo, Zr, and Pd. It will be clear to those skilled in the art that some preferred embodiments are designed to sustain the chemical breakdown of the starting material such that recovery of the solubilized metallic element from the liquid extract is maximized. In a manner well known in the art, once the chemical and physical breakdown taught by the present invention is achieved, then maximum metal recovery may be, in turn, achieved by precipitation of insoluble salts, electrowinning, or electrodeposition.

Another aspect of the present invention pertains to caustic silicate compositions that enable efficient and substantially complete extraction of a metallic element from a starting material comprising solids. As will be understood by those skilled in the art, once the underlying structure is broken down during typically protracted leaching with a liquid caustic silica solution taught by the present invention, a mixture of solids and liquid is formed, thereby chemically altering these solids whereby such solids may be separated as a solid residue from this mixture of solids and liquid. It should be evident that this solid residue contains the metallic element, and that recovery of the metallic element from the solid residue is then routinely attained.

Another aspect of the present invention pertains to caustic silicate compositions that enable efficient and substantially complete extraction of a metallic element from a starting material comprising liquids, especially aqueous liquids. Once the underlying structure of this starting solution or admixture is broken down during typically protracted leaching with a liquid caustic silica solution taught by the present invention, a mixture of solids and liquid is formed, thereby chemically altering the corresponding components whereby solids may be separated as a solid residue from this mixture of solids and liquid. It should be evident that this solid residue contains a plurality of metallic elements, and that recovery thereof from the residue is then routinely attained.

These and other objects and features of the present invention will become apparent from the following detailed description.

DETAILED DESCRIPTION OF THE INVENTION

The present invention provides compositions of caustic silicate solutions intended for a contacting and leaching step of a diversity of methodologies applicable for the extraction and recovery of a plurality of elements, more preferably for the extraction and recovery of a plurality of metals, still more preferably for the extraction and recovery of a plurality of metals such as lead, gold, cadmium, and/or zinc, from starting materials containing a plurality thereof. As is well known in the art, such methodologies typically commence with the step of leaching contaminated material to render certain impurities and contaminants susceptible to commonly used subsequent extraction and removal techniques. U.S. Pat. No. 5,549,811 exemplifies this common approach to separation of metallic elements and the like.

The present invention provides a new genre of contacting solutions that besides the conventional removal of soluble constituent elements from contaminated starting material or the like, chemically alters the underlying structure of this starting material, thereby significantly enhancing the extent to which certain elements are solubilized. It has been found that, by aggressively breaking down the typically complex and "hard-to-crack" underlying structures of starting materials such as mineral ores, recyclable wastes, contaminated water and soils, and toxic wastes, metal contaminants and the like may now be extracted therefrom using conventional processes in large recovery quantities heretofore unknown in the art.

It will be readily appreciated by those skilled in the art that the present invention is functionally based upon accelerating the solubilization of metallic elements—especially the ampholene metallic elements, exemplified by oxyanions. As will be understood by those skilled in the art, oxyanion formation such as zincate, $ZnO_2^{2-}$, occur only at very high pH or alkalinity values. Some of this formation even from high pH solution, i.e., from caustic content greater than 0.4% (0.10M having a pH value of 13), is so slow that a catalyst is required. Under the present invention, it will be appreciated that silica powder acts as such a catalyst for forming the intermediate silicate oxyanion. As shown in the hereinafter reactions, this silicate anion, in turn, reacts with the compound zinc oxide or zinc ferrate, thereby converting it into soluble zincate:

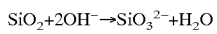

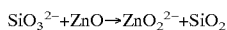

It will, of course, be understood that similar reactions occur with other metallic elements well known in the art.

As will be appreciated by those skilled in the art, it has also been found that the startling quantities of metallic elements extracted and recovered from starting materials contemplated hereunder are attributable to the compositions of the present invention preventing re-bonding or reformation of complexed structures before the subsequent extraction process or processes may be performed. That is, the contacting step of starting materials with compositions of the present invention transcends conventional leaching; the present invention enables the underlying complexed structure of contaminant materials and the like to be essentially permanently decomposed into simpler components that may effectively extract and remove metal elements and the like with an efficiency heretofore unknown in the art. As is well known in the art, by "complexing" is meant the presence of elements as mineral elements or charged ions that are solvated, chelated, or otherwise implicated or encapsulated in a structural arrangement characterized by a matrix of covalent bonds or the like.

Practitioners in the art will, of course, recognize that prior limitations upon the extent of extraction and removal of metals and the like from starting materials contemplated hereunder have caused inaccurate assays, i.e., underestimated assays, of the presence of contaminants and impurities contained therein. The unique ability of the present invention to break down covalent bonds and the like populating underlying structures of starting materials and the correlated ability to sustain this breakdown for sufficient duration to enable subsequent conventional extraction and removal procedures to be performed has enabled higher percentages of the formerly underestimated metallic elements to be extracted and reported.

It will be understood that, absent contacting treatment using an attacking and aggressive liquor reagent as taught by the present invention, if the conditions under which conventional leaching operations are performed are not carefully controlled—particularly with regard to pH and temperature—then re-complexing of the underlying structure of the starting material appears to occur due to reformation of covalent bonds or the like. But, applying a suitable composition of caustic silica solution as disclosed herein has been found to allow identification and assay of elements hereinbefore missed because of the limitations of the art. It is, of course, well known in the art that the concentration of compositions of the present invention, in conjunction with the contacting time, temperature, pressure, and pH determine the structural impact upon starting materials.

Thus, without restricting the present invention to any particular theory, it is postulated that a suitably formulated caustic silicate solution composition chemically alters the bonds within the molecules and/or compounds constituting the underlying structure of the starting material, thereby allowing certain elements, such as lead, gold, cadmium, and/or zinc, to be permanently disengaged therefrom and then readily solubilized and subsequently removed via a plurality of conventional extraction techniques. In addition, it is postulated that compositions of the present invention chemically alter the bonds within the molecules and/or compounds of the starting material, thereby allowing certain elements to be more accessible to and removed by conventional extraction processes. It is further postulated that certain atoms of particular elements are removed from the structure of the starting material, and that resulting vacancies within this structure are satisfied by replacement elements. For example, a hazardous or toxic element such as lead is removed from the molecular structure, and in other cases a valuable element such as a noble metal, e.g., gold, and is replaced by another element, preferably a non-hazardous, non-toxic, inexpensive element.

A. Caustic Silica Solution

The compositions of the present invention are based upon the presence of a caustic silica solution. The term "caustic silica solution" as used herein relates to a caustic aqueous solution, i.e., an aqueous solution with a pH greater than about 8, more preferably with a pH greater than about 9, still more preferably with a pH greater than about 10, and still more preferably with a pH greater than about 11) in which silica (i.e., $SiO_2$) has been dissolved.

Examples of caustic aqueous solutions include solutions of bases, including for example, solutions of strong Bronsted bases. Such bases include alkali metal hydroxides, particularly sodium hydroxide, i.e., NaOH, or potassium hydroxide, i.e., KOH, and ammonia, i.e., $NH_3$. Preferably, the caustic aqueous solution contemplated by the present invention comprises sodium hydroxide.

Sodium hydroxide, i.e., NaOH; ~40 grams/mole, is a water soluble hydroxide of an alkali metal, and is often referred to as a strong Bronsted base in aqueous solution. Another example of such an alkali hydroxide is potassium hydroxide, i.e., KOH. At 25° C., the pH of an aqueous solution of NaOH may be approximated as $pH \sim 14 + \log_{10}[NaOH]$, where [NaOH] denotes the concentration of NaOH in units of moles per liter. An aqueous solution of NaOH with a concentration of 1.0 molar, i.e., moles/liter, therefore has a pH of approximately 14; similarly, concentrations of 0.1, 0.01, 0.001, and 0.0001 molar NaOH yield approximate pH values of about 13, 12, 11, and 10, respectively. A 1.0 molar NaOH solution may be prepared by dissolving 1.0 mole of NaOH, i.e., 40 grams NaOH, in enough water to yield 1.0 liters of solution. In contrast, a 1.0 molal NaOH solution may be prepared by dissolving 1.0 mole of NaOH, i.e., ~40 grams NaOH, in 1 kilogram of water. Concentrations are often described in units of percent weight by weight, i.e., % w/w; for the purposes of this disclosure, a concentration so denoted is analogous to molality. For example, a 10% w/w NaOH aqueous solution may be prepared by dissolving 100 grams of NaOH, i.e., ~2.5 moles, in 1000 grams of water.

Alkali metal hydroxides, such as sodium hydroxide and potassium hydroxide, may be obtained from a wide variety of commercial suppliers in various forms, e.g., as a solid or an aqueous solution, and in various states of purity. Alkali metal hydroxides of moderate to high to very high purity may be used for the present invention, provided the contaminants do not significantly interfere. Preferably, the purity is greater than 90%, more preferably greater than 95%, still more preferably greater than 97%, yet still more preferably greater than 99%.

Preferred caustic silica solutions which have been found to be useful under the practice of the present invention comprise NaOH in a concentration from about 1% w/w to about 60% w/w—having a resulting pH of about 12–16. In some preferred embodiments, caustic silica solutions comprise NaOH in a concentration from about 1% w/w to about 30% w/w—having a resulting pH of about 12–14; more preferably, from about 5% w/w to about 25% w/w—having a resulting pH of about 13–14. The pH of the caustic silica solution may be measured using any known method, including, for example, optical, e.g., colored pH indicators or pH test paper, or electrical, e.g., electronic pH meters, methods. The pH of the caustic silica solution taught by the present invention should preferably be greater than about 10.3, more preferably greater than about 12, and still more preferably greater than about 13.

Embodiments of the caustic silica solutions useful in the practice of the present invention also comprise dissolved silica, i.e., $SiO_2$. The physical and chemical properties of silica, also known as silicon dioxide, are variously described in the published literature; see, for example, *Kirk-Othmer Encyclopedia of Chemical Technology*, 3rd Edition (John Wiley & Sons, 1978), vol. 20, pp. 748–781; and *The Chemistry of Silica*, by Ralph K. Iler (John Wiley & Sons, 1979), especially Chapter 1. Silica may be found in crystalline or amorphous forms, and the term "silica" is also often used to refer to silica which has been hydrated or hydroxylated to a greater or lesser degree; that is, to yield colloidal silica and silica gels. At ordinary temperatures, silica is chemically resistant to many common reagents. Common aqueous acids do not attack silica, except for hydrofluoric acid, i.e., HF, which forms fluorosilicate ions, i.e., $SiF_6^{-2}$. Different forms of silica have varying solubilities in water. For example, the solubility of quartz, e.g., a crystalline silica, at room temperature is about 6 ppm reported as $SiO_2$, i.e., 0.1 mmol/kg, whereas the solubility of many amorphous silicas is somewhat larger, from about 80 to about 130 ppm reported as $SiO_2$, i.e., 1.4 to 2.2 mmol/kg. Silica solubility increases with temperature, approaching a maximum at about 200° C.

An aqueous solution in equilibrium with amorphous silica at ordinary temperatures contains monomeric monosilicic acid (i.e., $Si(OH)_4$) also known as orthosilicic acid or silica hydrate (and is sometimes referred to as $H_4SiO_4$ or $H_2SiO_3$):

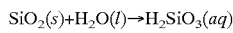
$SiO_2(s)+H_2O(l) \rightarrow H_2SiO_3(aq)$

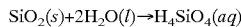
$SiO_2(s)+2H_2O(l) \rightarrow H_4SiO_4(aq)$

This acid is dibasic, dissociating in two steps:

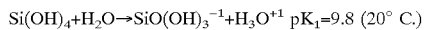
$Si(OH)_4+H_2O \rightarrow SiO(OH)_3^{-1}+H_3O^{+1}$ $pK_1$=9.8 (20° C.)

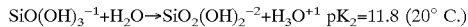
$SiO(OH)_3^{-1}+H_2O \rightarrow SiO_2(OH)_2^{-2}+H_3O^{+1}$ $pK_2$=11.8 (20° C.)

The first conjugate base, $SiO(OH)_3^{-1}$, is known as metasilicic acid, and is sometimes also referred to as $H_3SiO_4^{-1}$ or $H_3SiO_3^{-1}$. The solubility of amorphous silica appears to be a minimum at about pH 7 and increases markedly above pH 9. Below pH 9, the solubility is independent of pH; above pH 9, the solubility increases because of increased ionization of silicic acid. Above pH 9, species such as $H_3SiO_4^{-1}$ and the dimers $Si_2O_2(OH)_5^{-1}$ and $Si_2O_3(OH)_4^{-2}$ are important. Above pH 11, species such as $H_2SiO_4^{-2}$ and the dimers $Si_2O_4(OH)_3^{-3}$ are important. For example, the solubility of amorphous silica at 25° C. is reported as 138, 180, 310, and 876 ppm (reported as $SiO_2$) for pH values of 9, 9.5, 10, and 10.6, respectively.

Dissolved silica may be precipitated from a saturated or supersaturated solution to form amorphous silica, or it may undergo polymerization to give discrete particles which associate to give chains and networks, such as gels, or which grow in size and decrease in number to yield sols, such as colloidal silica. The rates of precipitation and polymerization are dependent on pH and salt concentration.

Preferred caustic silica solutions which are useful in the practice of the present invention comprise dissolved silica. Preferred caustic silica solutions comprise dissolved silica in a sufficient saturating concentration from about 0.001% to about 5% w/w (about 10 ppm to about 50,000 ppm), more preferably from about 0.001% to about 1% w/w (about 10 ppm to about 10,000 ppm), still more preferably from about 0.01% to about 0.5% w/w (about 100 ppm to about 5,000 ppm), and even more preferably about 0.1% w/w (about 1000 ppm). In this context, units of ppm are related to units of % w/w by the equation:

$(ppm)=(\% w/w) \times (10{,}000)$.

For example, a 1000 ppm $SiO_2$ or 0.1% w/w $SiO_2$ aqueous solution may be prepared by dissolving 1 gram of $SiO_2$, i.e., 0.0167 moles, in 1000 grams of water.

Silica may be obtained from a wide variety of commercial suppliers, usually as the solid, in various forms and various states of purity. Preferably, the caustic silica solutions useful in the present invention are prepared using amorphous silica. Preferably, the purity of the silica is greater than 90%, more preferably greater than 95%, still more preferably greater than 97%, yet still more preferably greater than 99%.

In order to prevent or minimize contamination and/or interference by adventitious components, the caustic silica solutions embodying the present invention are preferably prepared using purified water, such as distilled water, more preferably deionized distilled water.

The caustic silica solutions embodying the present invention may be prepared by any of a variety of known methods. For example, one part by weight of high purity, dry sodium hydroxide may be mixed with one part by weight of high purity, dry silica and three parts by weight of distilled deionized water in a suitable container such as a glass beaker or stainless steel vessel. To expedite preparation of the caustic silica solution, the mixture may be heated, for example, to approximately 100° C., using a hot plate or the like, and stirred occasionally or continuously using a mechanical paddle or magnetic stirring bar or the like. It may then be advantageous to add purified water to the mixture, as needed, to maintain the original volume. So treated, a suitable caustic silica solution may be obtained after a period of about 30 minutes to about 4 hours. If the solution were heated during preparation, it may be advantageous to allow it to cool to room temperature. It may be preferred to filter the solution using any suitable known means to remove some or all of any remaining undissolved material, for example, undissolved silica. For instance, the cool solution may be filtered through Whatman® Filter Paper #1 using a water aspirated Buchner funnel. The concentration of dissolved silica may be determined using atomic absorption or colorimetric analysis using a molybdic acid reagent or the like.

For embodiments of caustic silica solutions possessing relatively high concentrations of silica—approaching 1%—the presence of dissolved silica may be verified by titration with hydrochloric acid or another suitable acid to a pH of about 4–6, causing the dissolved silica to polymerize. The solution becomes cloudy and a silica gel forms.

It has been found that caustic silica solutions of the present invention should preferably be stored in an airtight container to prevent degradation. For example, degradation may be caused by adventitious carbon dioxide which dissolves to form carbonic acid, $H_2CO_3$, and then may react with and thereby neutralize dissolved NaOH to form water and $Na_2CO_3$. Accordingly, caustic silica solutions embodying the present invention should preferably be stored in an inert, or relatively inert, container. As will be understood by those skilled in the art, for long term storage, materials such as glass should be avoided; instead plastic containers, such as polyethylene bottles or barrels, are preferred. So stored, it has been found that caustic silica solution embodiments contemplated hereunder are stable for a period of at least several months.

B. Use of the Caustic Silica Solution

It should be clearly understood by those skilled in the art that use of an embodiment of the present invention introduces an aggressive, assaultative chemical processing step applied initially in the course of an extraction and removal procedure, preferably involving prolonged contacting between a starting material and the embodiment comprising a caustic silica solution composition.

The starting material may be contacted with this caustic silica solution liquor by simple mixing. If the starting material is a solid, or contains solid materials, a slurry of starting material and caustic silica solution may be prepared. Suitable proportions of starting material to caustic silica solution may easily be determined by the skilled artisan. For solid starting materials, such as soils, enough caustic silica solution may be added to form a slurry with acceptable handling properties, such as consistency and flow properties. For example, for a soil sample, proportions of approximately 5 liters of caustic silica solution per kilogram of soil have been found to be appropriate. For more dense materials, such as crushed ores, proportions of approximately 10 liters of caustic silica solution per kilogram of material have been found to be appropriate.

Once combined, the mixture may be allowed to stand undisturbed or it may be further mixed, stirred, or agitated. The mixture may be maintained at a temperature of from about 10 to about 200° C. In some preferred embodiments, the mixture is maintained at room temperature; in others, the mixture is heated. In some preferred embodiments, the mixture is heated and pressurized, for example, at a pressure of about 1 to 50 atmospheres, i.e., about 0.1 to 5 MPa. Once this admixture has been sufficiently combined, chemical processing taught by the present invention may continue for a period of minutes to days, more preferably for a period from about 10 minutes to about 6 hours, still more preferably for a period of about 1.5 hours. It will be understood that it is imperative for sufficient time to be allocated this contacting procedure in order to effectuate the breakdown of the starting material's underlying complexed structures so that subsequent extraction and removal of metal impurities and contaminants and the like may be accomplished at extreme levels hereinbefore unknown in the art.

After the appropriate period for this chemical processing under the influence of an embodiment of the caustic silica solution, it is contemplated that the treated admixture will be further processed by well known standard extraction means. For example, the solids of the mixture are separated from the liquid of the mixture. Typically, the mixture is filtered to remove the solids, i.e., treated material, solid residue, and yield a filtrate, i.e., extract, liquid extract. Any suitable filtration or separation method may be used. For example, the mixture may be filtered through a filter media, such as a filter paper or filter pad. Alternatively, the mixture may be separated by centrifugation or other mechanical means.

It should be clear that a key to the success of the present invention regarding extraction and removal of metals and other elements from contaminated materials and the like is that it triggers a powerful chemical process that alters the unerlying bonding structures of the starting material. It has been observed, in some instances, that elements in the starting material are solubilized. In other instances, it appears that elements remain in the residue, but are rendered more exposed and therefore more readily extracted using conventional processes. It has further been observed that the present invention prevents at least significant or noticeable re-formation of the bonding that constitutes the complexed structure of the starting material.

For example, it has been observed that chemical processing with a caustic silica solution taught by embodiments of the present invention as applied to a lead-containing material causes a large portion of the lead to be solubilized, i.e., placed in solution. Similarly, it has been observed that such chemical processing of a gold-containing material causes a large proportion of the gold to be solubilized. It will, of course, be understood that a solubilized element may be present in solution as a neutral element or as a charged ionic species, and may further be solvated, chelated or otherwise complexed by solvent, chelating agents, or complexing agents also present.

Once permanently solubilized as contemplated hereunder, the uncomplexed, susceptable elements can be removed from the extract solution using known methods. For example, dissolved elements, such as lead in the ionic form, $Pb^{+2}$, may be removed by precipitation in the form of an insoluble or sparingly soluble salt, e.g., lead sulfate ($PbSO_4$), by adding a suitable soluble salt, e.g., a sulfate such as sodium sulfate ($Na_2SO_4$). The solubility product of lead sulfate is approximately $1.06 \times 10^{-8}$ at 18° C.; the solubility in water is therefore about $10^{-4}$ moles per liter. Thus, by adding sodium sulfate until further precipitation is minimal, the residual lead ion concentration will be substantially reduced.

In an alternative subsequent extraction process, a solubilized species, such as the lead ion, i.e., $Pb^{+2}$, may be removed from the extract solution using an electrowinning process, for example, by electrolyzing the solution, or by adding another material with a standard electrode potential more negative than the standard electrode potential of the metal to be precipitated. For example, the standard electrode potential for lead (i.e., $Pb^{+2}+2e^{-1} \rightarrow Pb$) at 25° C. (as measured versus a normal hydrogen electrode) is $E°=-0.1263$ volts whereas the standard electrode potential for aluminum (i.e., $Al^{+3}+3e^{-1} \rightarrow Al$) at 25° C. (as measured versus a normal hydrogen electrode, in 0.1 M NaOH) is $E°=-1.706$ volts. See, for example, Millazzo and Caroli, *Tables of Standard Electrode Potentials*, Wiley-Interscience, New York, 1977. The electrode potential for aluminum is more negative than the electrode potential for lead (even at low lead ion concentrations). Thus aluminum metal will reduce lead ion according to the reaction $3Pb^{+2}+2Al \rightarrow 3Pb+2Al^{+3}$, the lead ion will precipitate as lead metal (often in the form of a sponge-like material) and the aluminum metal will be solubilized as aluminum ions. For optimal electrowinning, the aluminum metal is preferably powdered or otherwise divided, so as to promote reaction. Other materials with suitable electrode potentials may also be used. For example, the standard electrode potential for manganese (i.e., $Mn^{+2}+2e^{-1} \rightarrow Mn$) at 25° C. (as measured versus a normal hydrogen electrode) is $E°=-1.029$ volts, and may be predicted to be useful for electrowinning lead ions from solution.

Similarly, the standard electrode potential for the gold(I) ion, i.e., $Au^{+1}+e^{-1} \rightarrow Au$, at 25° C. (as measured versus a normal hydrogen electrode) is $E°=+1.68$ volts and the standard electrode potential for the gold(III) ion, i.e., $Au^{+3}+2e^{-1} \rightarrow Au+1$,) at 25° C. (as measured versus a normal hydrogen electrode) is $E°=+1.29$ volts. The electrode potential for aluminum is more negative than the electrode potentials for gold (even at low gold ion concentrations). Thus aluminum metal will reduce gold ions, which will precipitate as gold metal as the aluminum metal is solubilized as aluminum ions.

Also, the standard electrode potential for the zinc, i.e., $Zn^{+2}+2e^{-1} \rightarrow Zn$, at 25° C. (as measured versus a normal hydrogen electrode) is $E°=-0.763$ volts, and may be predicted to be useful for electrowinning lead ions and/or gold ions from solution.

It will be appreciated that the caustic silica solution compositions of the present invention have been found to facilitate the efficient and greatly enhance extraction and/or recovery of elements from starting materials such as mineral ores, recyclable wastes, contaminated soils, toxic wastes, e.g., listed and/or characteristic toxic wastes, and other materials. An example of a toxic waste is dust produced through steelmaking processes such as electric arc furnace dusts and BOP dusts.

It will also be appreciated that the caustic silica solution compositions of the present invention have been found to facilitate the efficient and greatly enhance the extraction and/or recovery of elements, more preferably metals, still more preferably heavy metals (i.e., metals with specific gravity of about 5.0 $g/cm^3$ or higher, such as chromium, vanadium, molybdenum, zirconium, zinc), noble metals (e.g., gold, silver, platinum), platinum group metals (e.g., platinum, palladium, nickel) group metals, and toxic metals (e.g., aluminum, cadmium, arsenic, lead, silver, mercury, barium, selenium), and other metals (e.g., titanium).

C. Examples

Several illustrations of the applicability of embodiments of the present invention are shown in the following examples. It should be noted that a number of the standardized methods used for sample preparation and analysis are briefly described in the section following these examples.

Example 1

Lead Spiked ERA Soil Sample

A standard soil sample, ERA 0525-95-04-Pb, was obtained from Environmental Resource Associates® (Arvada, Colo.) with a certified spiked lead (Pb) concentration of 19,300 mg/kg. This standard was subsequently prepared in accordance with method ILMO 4.0 and was analyzed in accordance with method EPA 6010A (by Professional Service Industries, Inc., a certified analytical laboratory). The analysis indicated a lead concentration of 19,600 mg/kg (minimum detectable limit of 2 mg/kg).

A caustic silica solution was prepared by combining 340 grams of sodium hydroxide (NaOH; ~100% purity; Red Devil Lye®, Reckitt & Colman® Inc.), 1020 grams of distilled deionized water (from Barnstead Water Purifier®), and 340 grams of silica ($SiO_2$; 99.623%; Unimin® Corp.; +325 mesh). The mixture was stirred constantly for 6 hours while maintained at 220° F. (105° C.). The mixture was filtered through Whatman® No. 1 filter paper; the residue was discarded and the resulting filtrate was used as the caustic silica solution.

To 125.00 grams of the standard soil sample (which without pre-treatment is expected to yield 2,450 mg Pb) was added 150 mL of the above caustic silica solution, and the mixture allowed to stand at room temperature for 1.5 hours with occasional stirring. The mixture was filtered using Whatman® #41 (25–30 Tm) filter paper. An additional 300 mL of near boiling water was filtered through the same filter and into the same flask (first rinse), and a further 180 mL of near boiling water was filtered through the same filter and into the same flask (second rinse), for a total combined filtrate/rinsate volume of 610 mL.

A sample of the filtered residue (1.00 gram, after drying) was prepared in accordance with method EPA CLP ILMO 4.0 and analyzed in accordance with method EPA 6010A; the analysis indicated a lead concentration of 2,960 mg/kg. Thus, pre-treatment with the caustic silica solution reduced the lead content from 19,600 mg/kg to 2,960 mg/kg; that is, by 85%.

To the filtrate/rinsate was added 1.50 grams of aluminum powder (Al; 99.8%; –40+325 mesh; Johnson & Matthey®), and the mixture filtered through Whatman® #41 filter paper. The residue was discarded. A 100 mL aliquot of the resulting filtrate was prepared in accordance with method EPA CLP ILMO 4.0 and analyzed in accordance with method EPA 6010A (also by Professional Service Industries, Inc., a certified analytical laboratory). The analysis indicated a lead concentration of 125 mg/L.

As can be readily seen from these data, the lead content of the starting material, i.e., the spiked soil sample, was substantially reduced by treatment with the caustic silica solution embodying the present invention. This example demonstrates that a specific amount of lead in a soil sample (as spiked by the ERA and as supported by subsequent analysis) was removed from the soil sample and solubilized by treatment with the caustic silica solution, as described above. This example also demonstrates that the solubilized lead, once in solution, remained in solution for subsequent precipitation from solution by treatment with aluminum metal.

Example 2

Cadmium Spiked ERA Soil Sample

Another standard soil sample, ERA 0525-95-04-Cd, was obtained from Environmental Resource Associates® (Arvada, Colo.) with a certified spiked cadmium (Cd) concentration of 14,700 mg/kg. This standard was prepared in accordance with method EPA CLP ILMO 4.0 and analyzed in accordance with method EPA 6010A (by Professional Service Industries, Inc., a certified analytical laboratory). The analysis indicated a cadmium concentration of 16,700 mg/kg (minimum detection limit of 0.2 mg/kg).

To 125.00 grams of the standard soil sample (which without pre-treatment is expected to contain 2088 mg Cd) was added 150 mL of the caustic silica solution described in Example 1, and the mixture allowed to stand at room temperature for 1.5 hours with occasional stirring. The mixture was filtered using Whatman® #41 (25–30 Tm) filter paper. An additional 150 mL of near boiling water was filtered through the same filter and into the same flask, for a total combined filtrate/rinsate volume of 270 mL.

A sample of the filtered residue (1.00 gram, after drying) was prepared in accordance with method EPA CLP ILMO 4.0 and analyzed in accordance with method EPA 6010A. The analysis indicated a cadmium concentration of 14,400 mg/kg. Thus, pre-treatment had reduced the cadmium content from 16,700 mg/kg to 14,400 mg/kg; that is, by 14%.

To the filtrate/rinsate was added 1.50 grams of aluminum powder (Al; 99.8%; –40+325 mesh; Johnson & Matthey®). A precipitate was observed. The mixture of solution and precipitate was heated gently to aid in filtration. The temperature did not exceed 90° C. at any time. The mixture was filtered through Whatman® #41 filter paper. The residue was discarded. A 100 mL aliquot of the resulting filtrate was prepared in accordance with method EPA CLP ILMO 4.0 and analyzed in accordance with method EPA 6010A (also by Professional Service Industries, Inc., a certified analytical laboratory). The analysis indicated a cadmium concentration of 1.12 mg/L.

As can be readily seen from these data, the cadmium content of the starting material, i.e., the spiked soil sample, was notably reduced by treatment with the caustic silica solution taught by the present invention. This example demonstrates that a specific amount of cadmium in a soil sample (as spiked by the ERA and as supported by subsequent analysis) was removed from the soil sample and permanently solubilized by treatment with the caustic silica solution, as described herein. This example also demonstrates that the solubilized cadmium, once in solution, remained in solution for subsequent precipitated from solution by treatment with aluminum metal.

Example 3

Baghouse Material

A 1.00 grams sample of baghouse material was prepared according to method EPA 3050A, and analyzed according to method EPA 6010A (by Professional Service Industries, Inc., a certified analytical laboratory). Another 0.2 gram sample was prepared and analyzed (for mercury) in accordance with method EPA 7471A (using standard cold vapor atomic absorption methods). The results are reported in Table 1.

A caustic silica solution was prepared by combining 340 grams of sodium hydroxide (NaOH; ~100%; Red Devil Lye®, Reckitt & Colman® Inc.), 1020 grams of distilled deionized water (from Barnstead Water Purifier®), and 340 grams of silica ($SiO_2$; 99.623%; Unimin® Corp.; +325 mesh). The mixture was stirred constantly for 6 hours at 220° F. (105° C.). The mixture was filtered through Whatman® No. 1 filter paper; the residue was discarded and the resulting filtrate was used as the caustic silica solution.

A 125 gram sample of the same baghouse material was mixed with 500 mL of the above caustic silica solution for 2 hours at 220° F. The mixture was filtered through Whatman® No. 1 filter paper. An additional 500 mL of near boiling water was filtered through the same filter and into the same flask, for a total combined filtrate/rinsate volume of ~1000 mL. A 1.00 gram sample of residue (after drying) was prepared according to method EPA 3050A, and analyzed according to method EPA 6010A (by Professional Service Industries, Inc., a certified analytical laboratory). Another 0.2 gram sample was prepared and analyzed (for mercury) in accordance with method EPA 7471A (using standard cold vapor atomic absorption methods). The results are summarized in Table 1.

A 100 mL aliquot of the resulting filtrate was prepared according to method EPA 3010 and analyzed in accordance with method EPA 6010A (also by Professional Service Industries, Inc., a certified analytical laboratory), and the results are summarized in Table 1.

This example demonstrates that the amounts of various metals in the untreated sample were altered—either increased or decreased—in the wash residue, as detected by identical standard methods. As can readily be seen from the data, treatment with the caustic silica solution resulted in an increase in detectable metals in the residue in every case except for lead and selenium. The detectable content of barium rose from 295 mg/kg to 4,900 mg/kg; that is, by a factor of almost 17. The detectable content of cadmium, chromium, and silver increased by a factor of about 2. In contrast, pre-treatment reduced the amount of detectable lead in the residue, from 14,600 mg/kg to 4,230 mg/kg; that is, by about 71%. This lead was rendered soluble and was detected in the filtrate. Similarly, pre-treatment reduced the amount of detectable selenium in the residue, from 172 mg/kg to 167 mg/kg; that is, by about 3%. This selenium was rendered soluble and was detected in the filtrate.

TABLE 1

Example 3: Baghouse Material

| Metal | Baghouse Dust (mg/kg) | Residue Following Rinse (mg/kg) | Factor Increase (Decrease) | Filtrate (mg/L) |
|---|---|---|---|---|
| Arsenic | 2050 | 2490 | 1.21 | 279 |
| Barium | 295 | 4900 | 16.6 | 0.295 |
| Cadmium | 892 | 1680 | 1.88 | 3.32 |
| Chromium | 468 | 862 | 1.84 | 0.75 |
| Lead | 14600 | 4230 | (0.29) | 2,990 |
| Mercury | 0.71 | 2.03 | 2.85 | <0.01 |
| Selenium | 172 | 167 | (0.97) | 27.2 |
| Silver | 24.5 | 53.4 | 2.18 | <0.03 |

Example 4

California Head Ore

A caustic silica solution was prepared by combining 340 grams of sodium hydroxide (NaOH; ~100%; Red Devil Lye®, Reckitt & Colman® Inc.), 1020 grams of distilled deionized water (from Barnstead Water Purifier®), and 340 grams of silica ($SiO_2$; 99.623%; Unimin® Corp.; +325 mesh). The mixture was stirred continuously for 6 hours at 220° F. (105° C.). The mixture was filtered through Whatman® No. 1 filter paper; the residue was discarded and the resulting filtrate was used as the caustic silica solution.

A sample of 454 gram of California Head Ore was split into two equal portions of 227 grams each. One of the portions was used for all tests on the untreated California Head Ore. A 10 gram sample of untreated-California Head Ore was "fired" in a standard gas fire assay furnace by American Assay Lab and analyzed for gold, silver, platinum, and palladium. These results are summarized in Table 2. A 1.00 gram sample of California Head Ore was prepared according to method EPA 3050A, and analyzed according to method EPA 6010A (by American Assay Lab, a certified analytical laboratory). A small portion of the sample was prepared and analyzed (for mercury) in accordance with method EPA 7471A (using standard cold vapor atomic absorption methods). The results are reported in Table 2.

An additional 10 grams of untreated California Head Ore was sent to the MacKay School of Mines in Reno, Nev. for "firing" in an induction furnace at the same temperature used in the standard gas fire assay furnace. The sample was then sent back to American Assay Lab for analysis of gold content, using standard flame atomic absorption methods. These results are summarized in Table 2.

The remaining 227 gram portion of California Head Ore was mixed with 1000 mL of the above caustic silica solution for 3 hours at 90° C. The mixture was filtered through Whatman® No. 1 filter paper, and the "wash" filtrate collected (designated as "filtrate A"). An additional 1000 mL of near boiling water was filtered through the same filter and into a different flask, and the "rinse" filtrate collected (designated "filtrate B"). To each of the wash and rinse filtrates was added 0.5 grams of aluminum powder (Al; 99.8%; −40+325 mesh; Johnson & Matthey). A precipitate was observed in both cases. The mixtures were filtered through Whatman® No. 1 filter paper, and the residues (from wash "filtrate A" and rinse "filtrate B") were collected, and dried. The collected residue (aluminum precipitate) from the wash filtrate (designed as "Al precipitate A") weighed 17 grams. The collected residue (aluminum precipitate) from the rinse filtrate (designated as "Al precipitate B") weighed 13 grams. An 8 gram sample of residue ("Al precipitate A") was "fired" in a standard gas fire assay furnace by American Assay Lab and analyzed for gold, silver, platinum, and palladium. These results are summarized in Table 2. A one gram sample of residue ("Al precipitate A") was prepared according to method EPA 3050A, and analyzed according to method EPA 6010A (by American Assay Lab, a certified analytical laboratory). A small portion of the sample was prepared and analyzed (for mercury) in accordance with method EPA 7471A (using standard cold vapor atomic absorption methods). Results for eight metals are reported in Table 2.

The remaining 8 grams of residue ("Al precipitate A") was sent to the MacKay School of Mines in Reno, Nev. for "firing" in an induction furnace at the same temperature used in the standard gas fire assay furnace. The sample was then sent back to American Assay Lab for analysis of gold content, using standard flame atomic absorption methods. These results are summarized in Table 2.

A 6 gram sample of residue ("Al precipitate B") was "fired" in a standard gas fire assay furnace by American Assay Lab and analyzed for gold, silver, platinum, and palladium. These results are summarized in Table 2. A 1 gram sample of residue ("Al precipitate B") was prepared according to method EPA 3050A, and analyzed according to method EPA 6010A (by American Assay Lab, a certified analytical laboratory). A small portion of the sample was prepared and analyzed (for mercury) in accordance with method EPA 7471A (using standard cold vapor atomic absorption methods). Results for eight metals are reported in Table 2.

The remaining 6 grams of residue ("Al precipitate B") was sent to the MacKay School of Mines in Reno, Nev. for "firing" in an induction furnace at the same temperature used in the standard gas fire assay furnace. The sample was then sent back to American Assay Lab for analysis of gold content, using standard flame atomic absorption methods. These results are summarized in Table 2.

This example demonstrates that various metals/elements were extracted from the ore sample and solubilized by treatment with the caustic silica solution embodying the present invention, as described herein, and that the solubilized metals/elements remained in solution for subsequent precipitation from solution by treatment with aluminum metal. Treatment with this novel caustic silica solution effectively exposed metals, particularly gold and lead, and allowed them to be permanently solubilized as contemplated herein to thereby permit subsequent precipitation.

TABLE 2

Example 4: California Head Ore

| | Fired in Standard Gas Furnace | | | Fired in Induction Furnace | | |
|---|---|---|---|---|---|---|
| Metal | Untreated Head Ore mg/kg | Al Prec. A mg/kg | Al Prec. B mg/kg | Untreated Head Ore mg/kg | Al Prec. A mg/kg | Al Prec. B mg/kg |
| Gold | 0.069 | 0.63 | 0.53 | 0.068 | 0.41 | 0.21 |
| Platinum | <0.05 | <0.05 | <0.05 | — | — | — |
| Palladium | <0.05 | <0.05 | <0.05 | — | — | — |
| Arsenic | <0.10 | 3.6 | 8.6 | — | — | — |
| Barium | 69 | 45 | 35.8 | — | — | — |
| Cadmium | 8.33 | 0.59 | 0.1 | — | — | — |
| Chromium | 68 | 12.8 | 11.2 | — | — | — |
| Lead | 16 | 2.29% | 2.03% | — | — | — |
| Mercury | <0.10 | 0.30 | <0.10 | — | — | — |
| Selenium | 14 | 4.0 | 3.1 | — | — | — |
| Silver | 0.4 | 0.90 | 1.4 | — | — | — |
| Aluminum | 9,240 | 9.68% | 9.85% | — | — | — |

Example 5

Electric Arc Furnace (EAF) Baghouse Dust

This example provides a comparison between the application of a caustic silica solution embodiment of the present invention and application of a "control" solution—corresponding to an analogous solution that lacks dissolved silica as contemplated by the present invention.

A concentrated caustic silica solution (referred to herein as "FGC") was prepared by combining 750.0 grams of sodium hydroxide (NaOH; ~100%; Red Devil Lye®, Reckitt & Colman® Inc.), 1509.4 grams of purified water, and 198.3 grams of silica ($SiO_2$; 99.623%; Unimin-Silex® Corp.; +325 mesh) in a 4.0 L glass beaker. The mixture/slurry was stirred continuously using a motorized mechanical stirrer for 4 hours at 20±2° C. The mixture was filtered through a cloth coffee filter and Whatman® No. 1 filter paper. The residue was discarded and the resulting filtrate (FGC) was collected and stored in a plastic container. This concentrated caustic silica solution had a NaOH concentration of ~50% w/w. A 125 mL aliquot of this solution was analyzed (using ICP) for metal content and the data are summarized below in Table 3.

As a control, a concentrated sodium hydroxide solution (referred to herein as "SHC") was prepared by combining 750.2 grams of sodium hydroxide (NaOH; ~100%; Lewis Red Devil Lye®, Reckitt & Colman® (Inc.) and 1508.8 grams of purified water in a 4.0 L glass beaker. The resulting liquid (SHC) was collected and stored in a plastic container. This concentrated sodium hydroxide solution had a NaOH concentration of 50% w/w. A 125 mL aliquot of this solution was analyzed (using ICP) for metal content and the data are summarized below in Table 3.

A dilute caustic silica solution (referred to herein as "FGD") was prepared by diluting 126.4 grams of the concentrated caustic silica solution, FGC, with 1877.2 grams of water in a 2.0 L glass beaker. The resulting solution (FGD) was stored in a plastic container. This dilute caustic silica solution had a NaOH concentration of ~3% w/w. A 125 mL aliquot of this solution was analyzed (using ICP) for metal content and the data are summarized below in Table 3.

As a control, a dilute sodium hydroxide solution (referred to herein as "SHD") was prepared diluting 126.4 grams of the concentrated caustic silica solution, SHC, with 1877.2 grams of water in a 2.0 L glass beaker. The resulting liquid (SHD) was stored in a plastic container. This dilute sodium hydroxide solution had a NaOH concentration of ~3%. A 125 mL aliquot of this solution was analyzed (using ICP) for metal content and the data are summarized below in Table 3.

The test material used in this example was baghouse dust (also known as Electric Arc Furnace or EAF dust, listed as K061 waste, and referred to herein as "BHD") and was obtained from GST Steel Company®, Kansas City, Mo., USA. Prior to use, the BHD was dried to constant weight in air in an oven at 105° C. A 1 gram aliquot of this test material was analyzed (using ICP) for metal content and the data are summarized below in Table 3.

A 100.0 gram sample of dry baghouse dust, BHD, was mixed with 1000.1 grams of dilute caustic silica solution, FGD, in a 2.0 L beaker and stirred for 45 minutes at 20° C. The resulting slurry was filtered under vacuum using a water aspirated Buchner funnel using Whatman® No. 42 filter paper. Approximately 940 mL of filtrate (referred to herein as "FGD-X") was collected, and the remaining filtrate was discarded. A 125 mL aliquot of this solution was collected for laboratory analysis and a 10 mL sample was analyzed (using ICP) for metal content; the data are summarized below in Table 3.

The weight of the wet residue (referred to herein as "BHD-FGD") was 138.5 grams. A 10.6 gram aliquot of this residue was collected as a sample from which a 1.0 gram sample was analyzed (using ICP) for metal content; the data are summarized below in Table 3. Since the wet residue weighed 138.5 grams and was obtained from 100.0 grams of dry material, the 10.6 gram aliquot was calculated to have a dry weight of approximately (100.0/138.5)×(10.6)=7.65 grams. The remaining wet residue was thus calculated to have a dry weight of approximately 100.0−7.65=92.35 grams.

The remaining wet residue, BHD-FGD, calculated to have a dry weight of 92.35 grams, was mixed with 926.4 grams of concentrated caustic silica solution, FGC, in a 2.0 L glass beaker and mixed at room temperature with a motor driven mechanical stirrer. The estimated total volume of the slurry was 745 mL. The slurry was loaded into the reaction vessel of a 1.0 L autoclave (from Autoclave Engineers®) using a funnel. The autoclave was equipped with: a variable-speed belt-driven motor used for mechanical stirring and agitation; top venting ports for venting and loading samples; a bottom venting port for unloading samples; a pressure release valve; a heating coil controlled by a variac and a built-in thermocouple; a second calibrated thermocouple for measuring the temperature in the reaction vessel located at the center-interior of the vessel; and cooling coils for rapid cooling and control of the reaction vessel temperature. The slurry was stirred at a rate of approximately 60 cycles/minute throughout loading, reaction, and unloading. The temperature of the slurry was raised to an operating temperature of about 145±5° C. within about 30 minutes and maintained at that temperature for approximately 60 minutes. A slight pressure buildup was observed when the temperature exceeded 150° C. Following reaction, the slurry was rapidly cooled to a temperature less than 100° C. and the slurry drained into a 2.0 L glass beaker. The slurry was filtered under vacuum using a water aspirated Buchner funnel using a cloth coffee filter and Whatman® No. 42 filter paper, and the filtrate (referred to herein as "FGC-X") was collected. A 125 mL aliquot of this solution was collected for laboratory analysis and a 10 mL sample analyzed (using ICP) for metal content; the data are summarized below in Table 3.

The wet residue (referred to herein as "BHD-FGC") was collected and a 1.0 gram sample analyzed (using ICP) for metal content; the data are summarized below in Table 3.

TABLE 3

Example 5: Electric Arc Furnace Baghouse Dust (Caustic Silica Solution)

| Metal | BHD (mg/kg) | BHD-FGD (mg/kg) | FGD (mg/L) | FGD-X (mg/L) | BHD-FGC (mg/kg) | FGC (mg/L) | FGC-X (mg/L) |
|---|---|---|---|---|---|---|---|
| Al | 3,790 | 3,690 | 1.8 | 2.3 | 2640 | 36.4 | 211 |
| As | 0 | 0 | 0.1 | 0.0 | 0 | 1.1 | 0.7 |
| Ba | 294 | 279 | 0.2 | 1.4 | 302 | 0.8 | 0.7 |
| Cd | 412 | 410 | 0.0 | 0.0 | 382 | 0.0 | 14.4 |
| Cr | 1,190 | 1,120 | 0.0 | 3.2 | 1290 | 0.0 | 0.0 |
| Cu | 1,910 | 1,900 | 0.1 | 0.1 | 1380 | 0.0 | 74.7 |
| Fe | 229,000 | 217,000 | 0.9 | 1.2 | 241,000 | 13.4 | 84.2 |
| Pb | 18,600 | 12,400 | 0.0 | 560 | 1,800 | 1.3 | 1,510 |
| Ni | 180 | 172 | 0.0 | 0.0 | 257 | 0.0 | 0.0 |
| Se | 156 | 115 | 0.0 | 0.1 | 95 | 0.0 | 0.0 |
| Ag | 53 | 49 | 0.0 | 0.0 | 62 | 0.0 | 0.0 |
| Na | 6,720 | 5,930 | 10,300 | 11,900 | 38,800 | 240,000 | 276,000 |
| Zn | 244,000 | 241,000 | 0.9 | 144 | 83,000 | 7.3 | 21,400 |

As can be seen from the data summarized in Table 3, treatment with a caustic silica solution reduced the lead (i.e., Pb) content of the test material from 18,600 mg/kg (BHD) to 12,400 mg/kg (BHD-FGD) to 1,800 mg/kg (BHD-FGC); that is, to a value of about 9.7% of the original value (a 90.3% reduction). Similarly, treatment with a caustic silica solution reduced the zinc (i.e., Zn) content of the test material from 244,000 mg/kg (BHD) to 241,000 mg/kg (BHD-FGD) to 83,000 mg/kg (BHD-FGC); that is, to a value of about 34% of the original value (a 66% reduction).

In a control experiment, a 100.0 gram sample of dry baghouse dust, BHD, was mixed with 1000.8 grams of dilute sodium hydroxide solution, SHD, in a 2.0 L beaker and stirred to 45 minutes at 20° C. The resulting slurry was filtered under vacuum a water aspirated Buchner funnel using Whatman® No. 42 filter paper. Approximately 960 mL of filtrate (referred to herein as "SHD-X") was collected. A 125 mL aliquot of this solution was collected and a 10 mL sample analyzed (using ICP) for metal content; the data are summarized below in Table 4.

The weight of the wet residue (referred to herein as "BHD-SHD") was 123.0 grams. A 10.8 gram aliquot of this residue was collected and a 1.0 gram sample analyzed for metal content; the data are summarized below in Table 4. Since the wet residue weighed 123.0 grams and was obtained from 100.0 grams of dry material, the 10.8 gram aliquot was calculated to have a dry weight of approximately (100.0/123.0)×(10.8)=8.78 grams. The remaining wet residue was thus calculated to have a dry weight of approximately 100.0−8.78=91.22 grams.

The remaining wet residue, BHD-SHD, calculated to have a dry weight of 91.22 grams, was mixed with 917.2 grams of concentrated sodium hydroxide solution, SHC, in a 2.0 L glass beaker and mixed at room temperature with a motor driven mechanical stirrer. The slurry was loaded into the reaction vessel of a 1.0 L autoclave (from Autoclave Engineers®, described above) using a funnel. The slurry was stirred at a rate of approximately 60 cycles/minute throughout loading, reaction, and unloading. The temperature of the slurry was raised to an operating temperature of about 140±5° C. within about 50 minutes and maintained at that temperature for approximately 60 minutes. A slight pressure buildup was observed when the temperature exceeded 150°

C. Following reaction, the slurry was rapidly cooled to a temperature less than 100° C. and the slurry drained into a 2.0 L glass beaker. The slurry, having an approximate volume of 740 mL, was filtered under vacuum a water aspirated Buchner funnel using a cloth coffee filter and Whatman® No. 42 filter paper, and the filtrate (referred to herein as "FGC-X") was collected. A 125 mL aliquot of this solution was collected and a 10 mL sample analyzed for metal content; the data are summarized below in Table 4.

The wet residue (referred to herein as "BHD-SHC") was washed with approximately 1 L of purified water and dried overnight at 105° C. The entire recoverable amount was collected as a sample and a 1.0 gram sample of the dried residue was analyzed (using ICP) for metal content; the data are summarized below in Table 4.

TABLE 4

Example 5: Electric Arc Furnace Baghouse Dust (Control)

| Metal | BHD (mg/kg) | BHD-SHD (mg/kg) | SHD (mg/L) | SHD-X (mg/L) | BHD-SHC (mg/kg) | SHC (mg/L) | SHC-X (mg/L) |
|---|---|---|---|---|---|---|---|
| Al | 3,790 | 4,200 | 0.3 | 0.6 | 3,280 | 1.9 | 113.0 |
| As | 0 | 0 | 0.1 | 0.0 | 0 | 0.0 | 1.5 |
| Ba | 294 | 273 | 0.1 | 2.4 | 327 | 0.0 | 0.8 |
| Cd | 412 | 380 | 0.0 | 0.1 | 524 | 0.0 | 1.8 |
| Cr | 1,190 | 1,160 | 0.0 | 3.3 | 1,690 | 0.0 | 0.0 |
| Cu | 1,910 | 1,820 | 0.0 | 0.2 | 1,700 | 0.0 | 34.7 |
| Fe | 229,000 | 219,000 | 0.2 | 0.6 | 297,000 | 0.3 | 9.9 |
| Pb | 18,600 | 9,400 | 0.2 | 776 | 1,820 | 0.0 | 751.0 |
| Ni | 180 | 183 | 0.0 | 0.0 | 461 | 0.0 | 0.0 |
| Se | 156 | 86 | 0.3 | 0.3 | 101 | 0.0 | 0.0 |
| Ag | 53 | 44 | 0.1 | 0.0 | 81 | 0.0 | 0.0 |
| Na | 6,720 | 5,340 | 11,000 | 11,900 | 6,880 | 237,000 | 223,000 |
| Zn | 244,000 | 229,000 | 0.4 | 77.7 | 100,000 | 4.2 | 17,300 |

As can be seen from the data summarized in Table 4, treatment with a caustic silica solution reduced the lead (i.e., Pb) content of the test material from 18,600 mg/kg (BHD) to 9,400 mg/kg (BHD-FGD) to 1,820 mg/kg (BHD-FGC); that is, to a value of about 9.8% of the original value (a 90.2% reduction). Similarly, treatment with a caustic silica solution reduced the zinc (i.e., Zn) content of the test material from 244,000 mg/kg (BHD) to 229,000 mg/kg (BHD-FGD) to 100,000 mg/kg (BHD-FGC); that is, to a value of about 43% of the original value (a 57% reduction).

Thus, treatment with a caustic silica solution permitted a slightly better reduction in the lead content of the text material than did the sodium hydroxide control solution (90.3% reduction instead of 90.2% reduction). Treatment with a caustic silica solution also permitted a substantially better reduction in the zinc content of the text material than did the sodium hydroxide control solution (66% reduction instead of 57% reduction).

Samples of test material (BHD), residue (BHD-FGC), and control residue (BHD-SHC), were analyzed for the metal leachability using EPA Method 1311 entitled "Toxicity Characteristic Leaching Procedure" (TCLP). The data are summarized in Table 5 below.

TABLE 5

Example 5: Electric Arc Furnace Baghouse Dust - TCLP Data

| Metal | BHD (mg/L) | EPA Regulatory Limits (mg/L) | BHD-FGC (mg/L) | BHD-SHC (mg/L) |
|---|---|---|---|---|
| Al | 0.1 | † | 0.1 | 0.1 |
| As | 0.0 | 5 | 0.0 | 0.0 |
| Ba | 1.0 | 100 | 1.2 | 4.5 |
| Cd | 10.7 | 1 | 0.0 | 0.7 |
| Cr | 0.0 | 5 | 0.1 | 0.3 |
| Cu | 0.4 | † | 0.1 | 0.0 |
| Fe | 0.0 | † | 0.0 | 0.0 |
| Pb | 62.6 | 5 | 0.0 | 0.0 |
| Ni | 0.1 | † | 0.0 | 1.5 |
| Se | 0.0 | 1 | 0.0 | 0.0 |
| Ag | 0.0 | 5 | 0.0 | 0.0 |
| Na | 342.0 | † | 1750 | 354.0 |
| Zn | 1020 | † | 0.0 | 42.6 |

† Regulatory levels have not yet been established for these metals.

As can be seen from the data summarized in Table 5, treatment with a caustic silica solution reduced the leachable amounts of Pb, Zn, and Cd to values well below the regulatory limits (where applicable). In particular, the leachable amount of Pb was reduced from 62 mg/L to below the detection limit. Similarly, the leachable amount of Zn was reduced from 1020 mg/L to below the detection limit; this represents an improvement over the use of sodium hydroxide control solution, which reduced the leachable amount of Zn to 42.6 mg/L. Similarly, the leachable amount of Cd was reduced from 10.7 mg/L to below the detection limit; this represents an improvement over the use of sodium hydroxide control solution, which reduced the leachable amount of Cd to 0.7 mg/L.

Example 6

Spent Engraving Ferric Chloride Solution

This example and the ensuing examples illustrate the applicability of embodiments of the present invention to waste liquid starting solutions and the like. A caustic silica solution was prepared by combining 340 grams of sodium hydroxide (NaOH; ~100%; Fisher Scientific), 1020 grams of deionized water, and 340 grams of silica ($SiO_2$; 99.623%; Unimin Corp.) less than mesh. The mixture was stirred continuously for 6 hours at 220° F. (105° C.) and then filtered using vacuum via Whatman No. 1 filter paper. Next, the solid residue was discarded and the filtrate, a caustic silica solution (herein referred to as "FGL"), was used in testing for the removal of contaminants from a variety of aqueous solutions and simultaneous stabilization of the resultant solids.

The aqueous waste sample tested herein constituted conventional waste liquid that was acquired from a typical commercial engraving operation. This liquid waste, commonly known in the trade as "spent ferric chloride" comprises a ferric chloride solution used to etch copper plates until the copper concentration rises to the point of clear inefficiency. Analysis by Flame Atomic Absorption Spectrometry ("FASS" per Perkin Elmer Model 3500) revealed a copper concentration of 65000 ppm (6.5% weight/volume). The pH of the solution, as received, was negative 1.87.

A 100 ml aliquot was placed in a 250 ml beaker; while being subjected to constant stirring, FGL was added to the beaker until the solution pH rose to 9.5. Copious precipitation was observed throughout this procedure, which required 73 ml of FGL to reach a pH of 9.5. The resultant slurry was then filtered by vacuum via a Whatman No. 542 filter paper, with the filtrate being analyzed by Inductively Coupled Plasma Atomic Emission Spectrometry ("ICPAES") per Thermo Jarrel Ash Model Iris Advantage ICP for the following metal contaminants: Cu, Ni, Cr, Zn, As, Cd, Cr, Pb, Ag which are common in an engraving waste sample. Results are listed in Table 6.

TABLE 6

ICPAES Results

| Element | Concentration in PPM |
|---|---|
| Arsenic | ND |
| Nickel | ND |
| Cadmium | 0.031 |
| Chromium | ND |
| Lead | 0.047 |
| Copper | 0.12 |
| Zinc | 0.05 |
| Silver | 0.017 |

It should be noted that "ND" represents an element concentration that was below the inherent method detection limit ("MDL") as enumerated hereinafter in Table 9. The resultant solid fraction was then subjected to EPA Method 1311 entitled "Toxic Characteristic Leaching Procedure" ("TCLP") and then analyzed by ICPAES for metals outlined in the EPA procedure. The results are listed in Table 7.

TABLE 7

TCLP Results

| Element | Concentration in PPM |
|---|---|
| Arsenic | ND |
| Barium | 0.015 |
| Cadmium | ND |
| Chromium | ND |
| Lead | 0.035 |
| Mercury | NA |
| Selenium | 0.17 |
| Silver | 0.011 |

It should be noted that "NA" represents a metallic element for which there was no analysis. As will be understood by those skilled in the art, all of these results were well below the maximum allowable concentrations for a TCLP. Indeed, these maximum allowable concentrations are enumerated in Table 8.

TABLE 8

Maximum Allowable Concentrations for TCLP

| Element | Concentration in PPM |
|---|---|
| Arsenic | 5.0 |
| Barium | 100.0 |
| Cadmium | 1.0 |
| Chromium | 5.0 |
| Lead | 5.0 |
| Mercury | 0.2 |
| Selenium | 1.0 |
| Silver | 5.0 |

TABLE 9

Method of Detection Limits for TCLP Metals

| Element | Concentration in PPM |
|---|---|
| Arsenic | 0.014 |
| Barium | 0.012 |
| Cadmium | 0.001 |
| Chromium | 0.003 |
| Lead | 0.01 |
| Mercury | 0.008 |
| Selenium | 0.022 |
| Silver | 0.003 |

Example 7

Aircraft Manufacturing Aqueous Waste

An aqueous waste sample was obtained from an aircraft manufacturing company in which the contaminant is hexavalent chromium, i.e., Cr(VI). The sample was analyzed by FLAA wherein the chromium concentration was shown to be 1650 ppm. The pH of the solution, as received, was 3.35. A 500 ml aliquot was removed and placed in a 1000 ml beaker; while this solution was being stirred constantly, 5 grams of ferrous sulfate was added thereto for the purpose of converting the valance state of the chromium from Cr(VI) to Cr(III). FGL was then slowly added until the pH reached 9.5. Precipitation was observed and necessitated the addition of 20 ml of FGL in order to reach the desired pH. The contents of the beaker were then filtered by vacuum through a Whatman 542 filter paper. The filtrate was analyzed by FLAA; the chromium concentration was found to be 0.083 ppm. The solid fraction was subjected to a TCLP and results are enumerated in Table 10.

TABLE 10

TCLP Results for Aircraft Manufacturing Aqueous Waste Water

| Element | Concentration in PPM |
|---|---|
| Arsenic | ND |
| Barium | ND |
| Cadmium | ND |
| Chromium | 0.13 |
| Lead | 0.018 |
| Mercury | NA |
| Selenium | ND |
| Silver | 0.023 |

Example 8

Finishing Plant Aqueous Waste

A wastewater sample was obtained from a commercial metal finishing plant; the primary contaminant is zinc. This sample was analyzed by FLAA and the zinc concentration was found to be 235 ppm. The pH of the solution, as received, was 3.6. A 100 ml aliquot was removed from this solution and placed in a 250 ml beaker. While being subjected to constant stirring, the aliquot was mixed with 1.5 ml FGL, resulting in a pH of 9.3. The contents of the beaker were then filtered by vacuum through a Whatman 542 filter paper. The filtrate was analyzed by FLAA and found to have a zinc concentration of 0.13 ppm. Since zinc is not an element for which analysis is included in the instant procedure, no TCLP was performed on the solid fraction.

Example 9

Lead Standard Obtained from Fisher Scientific

As another example of the applicability of the present invention to contaminated liquid starting materials, a 250 ml certified lead standard having a concentration of 10000 ppm was purchased from Fisher Scientific and placed in a beaker. The standard was diluted to a final volume of 2.5 liters via addition of deionized water to the beaker; the pH of the solution was 0.78. While stirring constantly, 7.3 ml of FGL was added to the solution, resulting in a pH of 9.35. The contents of the beaker were then filtered by vacuum through a Whatman No. 542 filter paper; the filtrate was analyzed by FLAA for lead, wherein the lead concentration was found to be 0.15 ppm. A TCLP was performed on the solid fraction. Since a certified standard was used, and since no other contaminates were present, analysis was only conducted for lead. Lead concentration in the extraction solution was found to be 0.73 ppm.

Example 10

Battery Manufacturer Aqueous Waste

A wastewater sample was obtained from a commercial battery manufacturer; the primary contaminants in this waste stream are nickel, zinc, and lead. The pH of the sample, as received, was 7.1. Analysis of this sample, prior to treatment by ICPAES, found a concentration of 7.3 ppm for Ni, a concentration of 11.7 ppm for Zn, and a concentration of 5.8 ppm for Pb. A 500 ml aliquot was removed and placed in a 1000 ml beaker. Sulfuric acid was then used to drop the pH down to 2. Then, while stirring constantly, 17 ml FGL was added thereto, thereby increasing the pH to 9.5. The contents of the beaker were then filtered by vacuum through a Whatman 542 filter paper. The filtrate was then analyzed by ICPAES to ascertain that the metal concentrations contained therein were as follows: 0.23 ppm Ni, 0.17 ppm Zn, and 0.11 ppm Pb. Due to the low metal concentrations in the pretreated water sample and protocols of the TCLP, the procedure was not required to be performed.

It should be evident to those skilled in the art, that, based upon the experimental and field results demonstrated in examples 6–10, embodiments of the present invention afford a unique and strong ability for removing metal contaminants and the like from aqueous solutions. Several elements in different types of matrices were tested and yielded positive results. Not only were these contaminants successfully removed as taught by the present invention, but also the remaining solids were stabilized so as to be non-hazardous with regard to solid waste disposal.

D. Standard Methods of Sample Preparation and Analysis

The Environmental Protection Agency (EPA) has developed a variety of standardized procedures for sample preparation and analysis. These standardized procedures facilitate direct and accurate comparison of analysis results obtained by different laboratories.

EPA Method 3050A, entitled "Acid Digestion of Sediments, Sludges, and Soils," is described in detail in the EPA publication of the same name. This method is an acid digestion procedure used to prepare sediments, sludges, and soil samples for analysis by flame or furnace atomic absorption spectroscopy or by inductively coupled argon plasma spectroscopy. Briefly, in this method, a sample of approximately 1 to 2 grams is accurately weighed. To the sample is added 10 mL of nitric acid (i.e., $HNO_3$, 1:1), and the mixture heated to 95° C. and refluxed for 10 to 15 minutes without boiling. The mixture is allowed to cool to room temperature. A further 5 mL of concentrated nitric acid (i.e., $HNO_3$) is added the mixture refluxed for an additional 30 minutes. The mixture is allowed to cool to room temperature, and 2 mL of water and 3 mL of hydrogen peroxide (i.e., $H_2O_2$, 30%) added. The mixture is gently heated to begin reaction; caution is required to ensure that excessive effervescence does not result in loss of mixture. While heating, additional hydrogen peroxide (i.e., $H_2O_2$, 30%) is added in 1 mL aliquots, until effervescence is minimal, for a total amount not exceeding 10 mL. If the sample is to be analyzed using inductively coupled plasma (ICP), the mixture is further prepared by adding 5 mL of concentrated hydrochloric acid (i.e., HCl) and 10 mL of water, returning the mixture to a hot plate, and refluxing for 15 minutes at 95° C. The mixture is allowed to cool to room temperature, filtered, and diluted to 100 mL with water.

EPA Method 3010, entitled "Acid Digestion of Extracts for Total Recoverable or Dissolved Metal for Analysis by FLAA or ICP Spectroscopy;" is described in detail in the EPA publication of the same name. Briefly, when this method is used for the detection of metals, 2 mL of concentrated nitric acid (i.e., $HNO_3$) and 5 mL of concentrated hydrochloric acid (i.e., HCl) is added to a 100 mL aliquot of the sample liquid. If the sample is to be spiked, the spike solution is added at this time. The mixture is then heated in a steam bath or on a hot plate at 90–95° C. until the volume is reduced to 10–15 mL. The mixture is allowed to cool to room temperature, and filtered only if necessary (the filter is pre-cleaned with dilute nitric acid). The final volume is adjusted to 100 mL by the addition of water.

EPA Method ILMO 4.0 (CLP SOW), entitled "Soil/Sediment Sample Preparation," is described in detail in the EPA publication of the same name. This method is an acid digestion procedure used to prepare sediments, sludges, and soil samples for analysis by flame or furnace atomic absorption spectroscopy or by inductively coupled argon plasma spectroscopy. Briefly, in this method, the sample is mixed thoroughly to achieve homogeneity, and a sample of 1 to 1.5 grams accurately weighed and transferred to a 250 mL beaker. To the sample is added 10 mL of nitric acid (i.e., $HNO_3$, 1:1), and the slurry mixed and covered with a watch glass. The mixture is heated to 95° C. and refluxed for 10 minutes. The sample is allowed to cool to room temperature, and an additional 5 mL of nitric acid (i.e., $HNO_3$, 1:1) added and the mixture again refluxed at 95° C. for 30 minutes. The sample is allowed to cool to room temperature, and 2 mL of water and 3 mL of hydrogen peroxide (i.e., H2O2, 30%) added. The mixture is gently heated to begin reaction, and the sample heated until effervescence subsides. While heating, additional hydrogen peroxide (i.e., $H_2O_2$, 30%) is added in 1 mL aliquots until effervescence is minimal, for a total amount not exceeding 10 mL. The mixture is then allowed to cool to room temperature, and 5 mL of hydrochloric acid (i.e., HCl, 1:1) and 10 mL of water added. The mixture is heated to 95° C. for 10 minutes, allowed to cool, and diluted to 100 mL with water.

EPA Method ILMO 4.0 (CLP SOW), entitled "Water Sample Preparation (for ICP)," is described in detail in the EPA publication of the same name. Briefly, in this method, the sample is mixed thoroughly by shaking and a 100 mL aliquot transferred to a 250 mL beaker. To the sample is added 2 mL of nitric acid (i.e., $HNO_3$, 1:1) and 10 mL of hydrochloric acid (i.e., HCl, 1:1). If the sample is to be spiked, the spike solution is added at this time. The mixture heated for 2 hours at 95° C., allowed to cool to room temperature, filtered, and the volume adjusted to 100 mL with water.

EPA Method 6010A, entitled "Inductively Coupled Plasma-Atomic Emission Spectroscopy (ICP)," is described in detail in the EPA publication of the same name. This method permits the quantification of trace amounts of a number of metals, such as the "RCRA 8" metals (i.e., aluminum, cadmium, arsenic, lead, silver, mercury, barium, and selenium), as well as copper, nickel, platinum, palladium and gold in solution. Briefly, in this method, the instrument is set with proper operating parameters and conditions, as provided by the instrument manufacturer. The voltage is also set according to the manufacturer's recommendations. The argon gas is ignited, and the plasma is ionized and allowed to stabilize for approximately 30 minutes to ensure the instrument is thermally stable. The instrument is then profiled and calibrated according to the manufacturer's recommended procedures. Typically, the profile is done using a mercury arc lamp. The instrument is calibrated with calibration standard (as outlined in section 5.4 of the EPA publication). Prior to analysis, the instrument is flushed with 1% nitric acid.

EPA Method 7471A, entitled "Mercury in Solid or Semi-solid Waste (Manual Cold-Vapor Technique)," is described in detail in the EPA publication of the same name. Briefly, in this method, triplicate samples of 0.2 grams of the accurately weighed, and to each is added 5 mL of water and 5 mL of aqua regia. The mixtures are heated for 2 minutes at 95° C., and the mixtures allowed to cool. To each mixture is added 50 mL water and 15 mL of 5% (w/v) potassium permanganate solution (i.e., $K_2MnO_4$, mercury-free). The mixtures are mixed thoroughly, heated at 95° C. for 30 minutes, and allowed to cool. To each mixture is added 6 mL of sodium chloride hydroxylamine sulfate (prepared by dissolving 12 grams of sodium chloride and 12 grams of hydroxylamine sulfate in reagent grade water to yield 100 mL of solution) to reduce the excess permanganate. During analysis, a circulating pump (with a pre-adjusted rate of 1 liter/min) is run continuously. The measurement should reach a maximum within about 30 sec.

EPA Method 1311, entitled "Toxicity Characteristic Leaching Procedure" is described in detail in the EPA publication of the same name. This method is designed to determine the mobility of both organic and inorganic analytes present in liquid, solid, and multiphasic wastes. Briefly, in this method, for materials containing greater than or equal to 0.5% solids, the liquid, if any, is separated from the solid phase and stored for later analysis; the particle size of the solid phase is reduced, if necessary. The solid phase is extracted with an extraction fluid (comprising glacial propanoic acid, $CH_3CH_2COOH$, and, if necessary, sodium hydroxide, NaOH), and the liquid extract separated from the solid phase by filtration through a 0.6–0.8 Tm glass fiber filter. The liquid and liquid extract are combined and analyzed, or, if necessary, analyzed separately and the results combined mathematically.

It should thus be clear that the present invention teaches a liquor contacting solution that chemically reacts with the contaminated starting material and the like. As demonstrated herein, this chemical reaction appears to break the bonds of the underlying complexed structure thereby rendering the metallic elements that were encapsulated therein to be susceptible to being solubilized. It has been shown that it is an aspect and feature of the present invention that once the metallic elements have been released from the grasp of these formerly strongly bonded structures and brought into solution, that these solubilized elements tend to remain in solution, i.e., these released elements are biased not to re-form the bonds that have been broken.

It should be understood that the present invention improves the state of the art taught by Rizet in U.S. Pat. No. 5,549,811 and by Reiterer in European Pat. No. 34137. That is, while Rizet and Reiterer use a caustic solution—sodium hydroxide—to leach starting materials as an initial step in the extraction and removal process, the present invention teaches a caustic silica solution. But, as hereinbefore described in detail, the caustic silica solutions of the present invention do not merely leach starting material, but are formulated with saturating amounts of silica to provide sufficient impetus to vigorously attack the bonds that constitute its underlying structure. Once this structure is broken, the metallic elements and the like appear to be compelled to remain in solution so that subsequent conventional metal extraction and removal may be performed. It should be understood by those skilled in the art that, while the prior art exemplified by Rizet refers to residual silica contained in a wash solution or the like, no silica is present in the leach solution when the leaching process commences. Indeed, it is an important feature of the present invention that saturating levels of silica are formulated into the caustic silica solutions to have the described impact on the starting materials.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. An aqueous caustic silica solution for treating a contaminated starting material having mineral elements and charged ions, said mineral elements and charged ions being solvated, chelated, or complexed in a structural arrangement, said aqueous caustic silica solution comprising:

an admixture of silica and at least one compound selected from the group consisting of sodium hydroxide, potassium hydroxide, and ammonium hydroxide in water;

said aqueous caustic silica solution comprising from about 0.5% to about 5% w/w dissolved silica and about from 5% to about 60% w/w of a hydroxide component; and said aqueous caustic silica solution adapted to contact said starting material to effect breaking apart said structured arrangement and adapted to, subsequently, release said mineral elements and said charged ions from said structured arrangement, and further adapted to solubilize said released mineral elements and said charged ions and to sustain said solubility thereof.

2. The aqueous caustic silica solution according to claim 1, wherein said hydroxide component comprises, at least one compound selected from the group consisting of sodium hydroxide, potassium hydroxide, and ammonium hydroxide.

3. The aqueous caustic silica solution according to claim 1, wherein said hydroxide component comprises from about 5% to about 25% w/w sodium hydroxide.

* * * * *